United States Patent [19]

Hicks et al.

[11] Patent Number: 5,150,470

[45] Date of Patent: Sep. 22, 1992

[54] DATA PROCESSING SYSTEM WITH INSTRUCTION QUEUE HAVING TAGS INDICATING OUTSTANDING DATA STATUS

[75] Inventors: Troy N. Hicks; MyHong NguyenPhu, both of Austin, Tex.

[73] Assignee: International Business Machines Corporation, Armonk, N.Y.

[21] Appl. No.: 453,529

[22] Filed: Dec. 20, 1989

[51] Int. Cl.[5] .............................................. G06F 9/30
[52] U.S. Cl. ............................ 395/375; 364/DIG. 1;
364/239.4; 364/258.4; 364/262.8
[58] Field of Search .................... 364/200, 900, 748;
395/375

[56] References Cited

U.S. PATENT DOCUMENTS

| | | | |
|---|---|---|---|
| 4,179,736 | 12/1979 | Wilhite | 364/200 |
| 4,675,806 | 1/1987 | Uchida et al. | 364/200 |
| 4,953,082 | 8/1990 | Nomura et al. | 364/200 |
| 4,972,317 | 11/1990 | Buonomo et al. | 364/200 |
| 4,999,802 | 3/1991 | Cocanougher et al. | 364/748 |
| 5,001,624 | 3/1991 | Hoffman et al. | 364/200 |
| 5,045,992 | 3/1991 | Yates et al. | 364/200 |

Primary Examiner—Thomas C. Lee
Assistant Examiner—Alpesh M. Shah
Attorney, Agent, or Firm—Thomas E. Tyson

[57] ABSTRACT

A data processing system having an instruction execution circuit that executes a first type of instruction. Also included is a fetch circuit that fetches instructions from a memory and fetches data from the memory in response to a second type of instruction. An instruction decoder is included that decodes fetched instructions and dispatches instructions of the first type to an instruction queueing circuit. The instruction decoder further dispatches instructions of the second type to the fetching circuit. The instruction queueing circuit includes the capability to store decoded instructions of the first type while tagging these instructions when data required for the execution of these instructions has not been fetched. The instruction queueing circuit further clears these tags of these instructions of the first type when data that is required for the execution has been fetched. The instruction queueing circuit serially provides the untagged instructions of the first type to the instruction execution circuit.

9 Claims, 8 Drawing Sheets

INSTRUCTION  LD₀  0
SEQUENCE:
            MULT  2 2 3

LD₁  1     FIG. 6A

ADD  4 0 1

T A B

INSTRUCTION  LD₀  0
SEQUENCE:
            DIV  2 2 3

LD₁  1     FIG. 7A

ADD  4 0 1

INSTRUCTION  LD₀  0
SEQUENCE:
            LD₁  1

ADD  4 0 5   FIG. 8A

MULT  6 7 0

| CYCLE | 0 | 1 | 2 | 3 | 4 | 5 | 6 |
|---|---|---|---|---|---|---|---|
| DEC0 | $LD_0$ | $LD_1$ | -- | -- | -- | -- | -- |
| DEC1 | MULT | ADD | -- | -- | -- | -- | -- |
| LOAD 1 | -- | -- | $LD_1$ | $LD_1$ | -- | -- | -- |
| LOAD 0 | -- | $LD_0$ | $LD_0$ | $LD_0$ | $LD_1$ | $LD_1$ | -- |
| DATA RDY | 150 | | | | | | |
| BUF0 | -- | -- | -- | -- | -- | -- | -- |
| TAG0 | -- | -- | -- | -- | -- | -- | -- |
| BUF1 | -- | -- | ADD | ADD | ADD | ADD | |
| TAG1 | -- | -- | 11 | 11 | 01 | 01 | 00 |
| EXE | -- | MULT | -- | -- | -- | -- | ADD |

| CYCLE | 0 | 1 | 2 | 3 | 4 | 5 | 6 | 7 | 8 |
|---|---|---|---|---|---|---|---|---|---|
| DEC0 | LD0 | LD1 | -- | -- | -- | -- | -- | -- | -- |
| DEC1 | DIV | ADD | -- | -- | -- | -- | -- | -- | -- |
| LOAD 1 | -- | -- | LD1 | LD1 | -- | -- | -- | -- | -- |
| LOAD 0 | -- | LD0 | LD0 | LD0 | LD1 | LD1 | -- | -- | -- |
| DATA RDY | 152 | | | | | | | | |
| BUF0 | -- | -- | -- | -- | -- | -- | -- | -- | -- |
| TAG0 | -- | -- | -- | -- | -- | -- | -- | -- | -- |
| BUF1 | -- | -- | ADD | ADD | ADD | ADD | ADD | ADD | -- |
| TAG1 | -- | -- | 11 | 11 | 01 | 01 | 00 | 00 | 00 |
| EXE | -- | DIV | DIV | DIV | DIV | DIV | DIV | DIV | ADD |

| CYCLE | 0 | 1 | 2 | 3 | 4 | 5 | 6 | 7 | 8 | 9 |
|---|---|---|---|---|---|---|---|---|---|---|
| DEC0 | LD0 | ADD | : | : | : | : | : | : | : | : |
| DEC1 | LD1 | MULT | : | : | : | : | : | : | : | : |
| LOAD 1 | : | LD1 | LD1 | LD1 | : | : | : | : | : | : |
| LOAD 0 | : | LD0 | LD0 | LD0 | LD1 | LD1 | LD1 | LD1 | LD1 | : |
| DATA RDY | | | | | | | | | | |
| BUF1 | : | : | MULT | MULT | : | : | : | : | : | : |
| TAG1 | : | : | 01 | 01 | : | : | : | : | : | : |
| BUF0 | : | : | ADD | ADD | MULT | MULT | MULT | : | : | : |
| TAG0 | : | : | 01 | 01 | 00 | : | : | : | : | : |
| EXE | : | : | : | : | ADD (00) | MULT | : | : | : | : |

FIG. 8B

DATA PROCESSING SYSTEM WITH INSTRUCTION QUEUE HAVING TAGS INDICATING OUTSTANDING DATA STATUS

TECHNICAL FIELD

This invention relates to data processing systems and particularly to a data processing system having multiple processing units executing a single sequence of instructions.

BACKGROUND ART

A common problem encountered in modern Von Neuman architecture is the access of instructions and data from the same memory. In modern data processing systems, an access to memory is very time consuming as compared to instruction execution within a processing unit. The problem of time consumption due to memory access has been alleviated to some extent by the use of cache memory, a very fast memory that is connected to the data processing system to hold frequently used information. However, if the information to be accessed is not available in the cache memory, then the additional time is required to access the main memory. In a conventional pipelined data processing system, instructions are executed in sequence but in a quasi-parallel fashion. Each instruction is executed in several phases, and while one instruction phase is being executed, other phases of other instructions are also executed in parallel. As a result of the pipelined process concurrent execution of instructions is carried out in an orderly manner while maintaining the sequential relationship of the instructions. However, ordinarily when an instruction requires data from memory, the pipeline is halted while the data is fetched from the memory, thus destroying many of the advantages of the concurrent or parallel instruction prosecution in the pipeline processing. The object of the present invention is to minimize this penalty caused by the memory access.

One method used in the past to address this problem was the tagging of a register that is the target of an outstanding load operation (i.e., the register that is to receive data from memory). This technique is discussed in co-pending reissue application Ser. No. 07/285,827 filed Dec. 16, 1988, from U.S. Pat. No. 4,630,195, originally filed May 31, 1984. According to this teaching, each register of the processor include a tag storage facility. When instructions are being executed that do not require data from the tagged registers, the instruction execution is allowed to continue. However, if an instruction is being executed which depends upon data to be stored in a tagged register, and the register has not received the data as indicated by the tag, the instruction is not executed.

The object of the present invention is to provide a tagging mechanism for a data processing system that includes multiple processors where the execution of one instruction is performed in a first processor while data for the instruction is fetched by a second processor. The invention provides the sequential instruction execution capability by allowing the orderly execution of pipelined instructions while managing data accesses from memory.

DISCLOSURE OF THE INVENTION

In accordance with the present invention, a data processing system is provided that includes an instruction execution circuit for executing a first type of instructions. A fetching circuit is provided to fetch instructions from a memory and for fetching data from a memory in response to a second type of instructions. Also included is an instruction decoder that decodes fetched instructions and dispatches instructions of the first type to an instruction queueing circuit and dispatches instructions of the second type to the fetching circuit. The instruction queueing circuit stores decoded instructions of the first type and tags these instructions of the first type when data required for execution of these instructions has not yet been fetched. The tags for these instructions are cleared when the data required for execution has been fetched. The instruction queueing circuit serially provides the untagged instructions to the instruction execution circuit for execution.

In the preferred embodiment, a multiprocessing system is provided wherein the memory contains both instructions and data. In this preferred embodiment, two processors are included for executing instructions from the instruction control unit. In this preferred embodiment, the instructions of the first type are floating point instructions that can only be executed by a floating point processor. The instructions of the second type are load instructions for providing floating point data to the floating point processor registers and are executed by the fixed point processor. The fixed point processor actually computes the addresses that are placed on the bus to the memory to access the floating point data. Furthermore, in the preferred embodiment, a first queue is provided to store register to register instructions and register to memory instructions, and a second queue is provided that stores the memory to register instructions. The instruction decoding means in the preferred embodiment includes the capability to decode multiple instructions in parallel. The load instructions are stored in an instruction queue (the memory to register queue) separately from the other floating point arithmetic instructions which are stored in the other queue. When a floating point arithmetic instruction requires data that is being loaded as a result of a load instruction, the floating point arithmetic instruction is tagged in its instruction queue. When an instruction has no tags, it is provided to the floating point processor for execution.

BRIEF DESCRIPTION OF THE DRAWINGS

The foregoing and other objects, aspects and advantages of the invention will be better understood from the following detailed description of the Best Mode for Carrying Out the Invention with reference to the figures listed below, in which:

FIG. 6A is a first sequence of instructions;

FIG. 6B is a timing diagram illustrating the pipelined execution of the instruction sequence in FIG. 6A;

FIG. 7A is a second instruction sequence;

FIG. 7B is a timing diagram illustrating the pipelined execution of the instruction sequence in FIG. 7A;

FIG. 8A is a third instruction sequence; and

FIG. 8B is a timing diagram illustrating the pipelined execution of the instruction sequence in FIG. 8A.

BEST MODE FOR CARRYING OUT THE INVENTION

Figure 1:
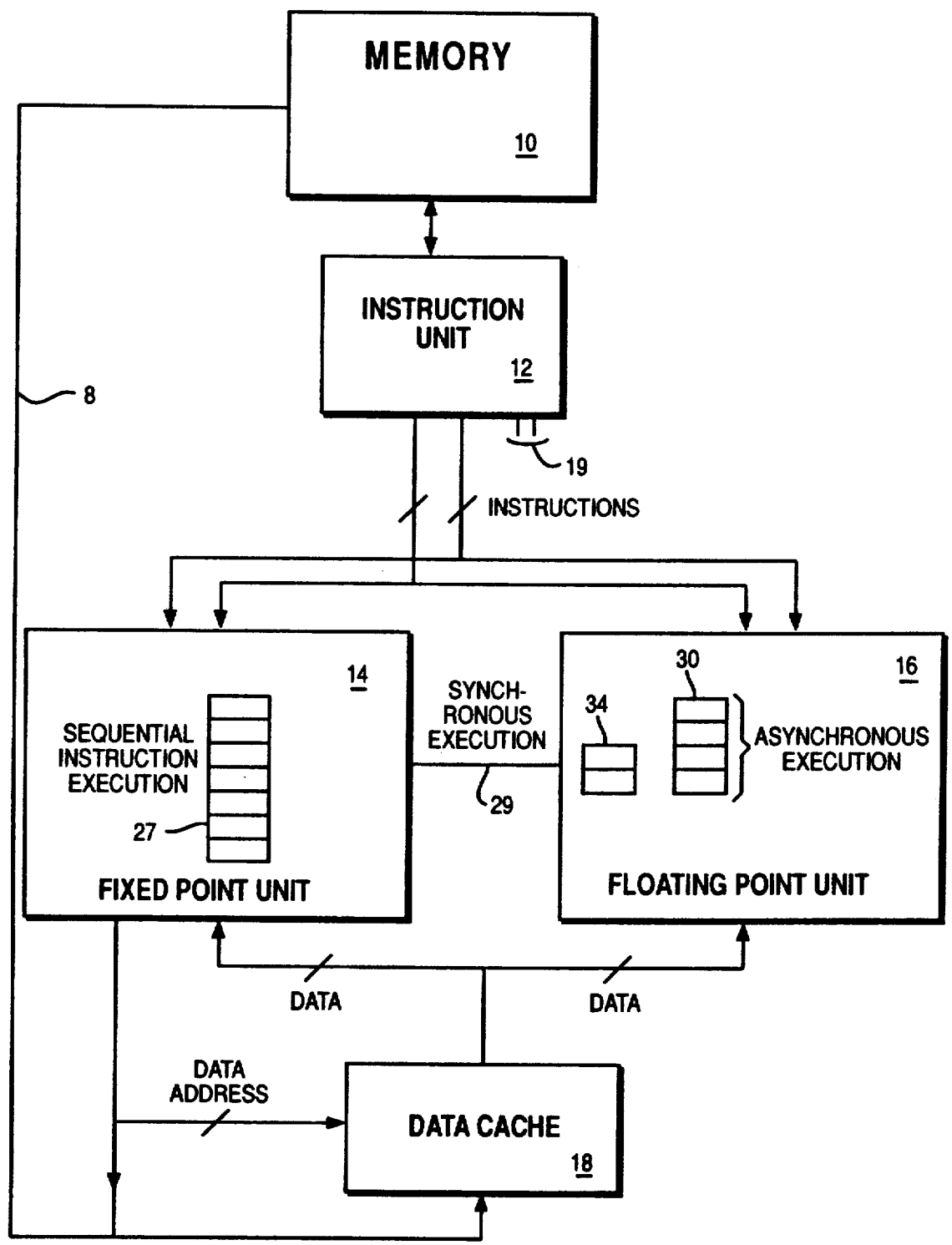
FIG. 1 is a block diagram of the data processing system.

FIG. 1 is a block diagram illustrating the data processing system including a memory 10 connected to an instruction unit 12. The output of the instruction unit 12 is two instructions that can be provided to the fixed point processing unit 14 or the floating point processing unit 16. The fixed point processing unit includes an instruction queue 27, referred to as the "sequential instruction execution queue". The floating point processing unit 16 includes an instruction queue 34 which are synchronous instructions executed by the fixed point processing unit 14 in a second queue 30 which includes instructions termed "asynchronous instructions". The execution of instructions by the floating point processing unit 16 is independent from the execution of instructions by the fixed point unit 14, except for the "synchronous instructions". The "synchronous instructions" include load data instructions that provide data from the memory 10 to the floating point processing unit 16 registers. The address computations for these load instructions are performed by the fixed point processing unit 14, such as the fixed point calculation for an indexed load instruction. The fetching of data is initiated by the fixed point processing unit 14 to the memory 10. Data is then provided through the data cache 18 to the registers in the floating point processing unit 16. The load data instructions for the floating point processing unit 16 are contained in both queues 34 and 27. The coordination of the load instruction storage is provided by a line 29.

Figure 2:
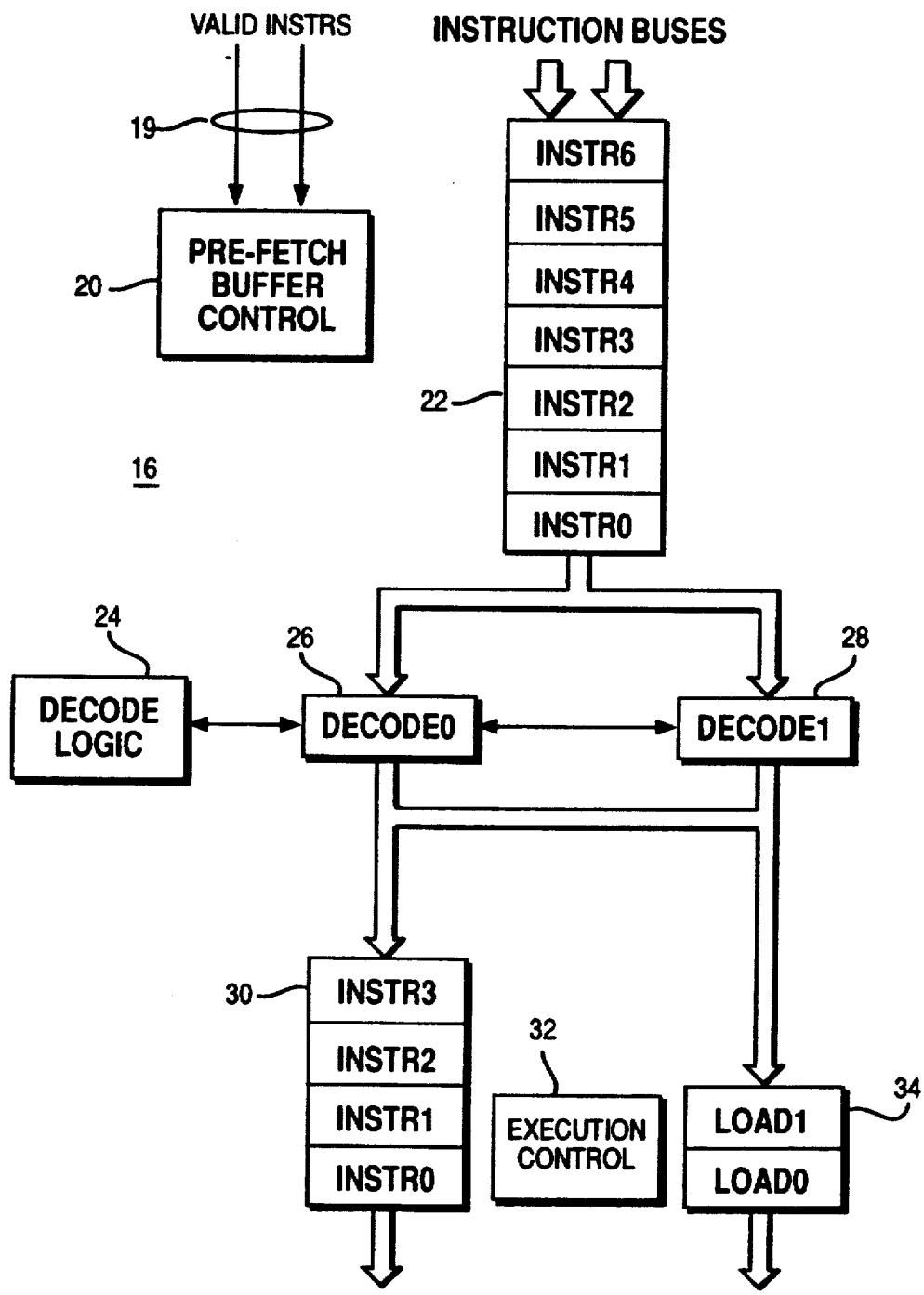
FIG. 2 is a block diagram illustrating the instruction queues located in the floating point unit.

FIG. 2 is a block diagram illustrating and a floating point processing unit 16. Instructions are examined by the prefetched buffer control 20 to determine if these instructions are valid. If an instruction is a valid instruction, it is stored in the floating point instruction queue 22. These instructions are then decoded two at a time in decoders 26 and 28 under the control of the code logic 24. The decoded instructions are then provided to the instruction queues 30 and 34 and placed into the first available buffer. The floating point processing unit instructions, other then the load data instructions, are stored in the instruction queue 30. This includes all floating point processing unit register to register and register to memory operations. The memory to register operations for the floating point processing unit 16 (that load data instructions) are stored in the instruction queue 34. These instructions in queues 30 and 34 are dispatched by the execution control unit 32 at the appropriate time.

In operation, the instructions in the instruction queue 30 may require data to be stored in the floating point processing unit registers. This data must be stored before these instructions can be dispatched for execution. The tagging apparatus of the present invention is provided for the appropriate management of these instructions to ensure that when the instructions are dispatched that data required by these instructions has been appropriately stored in the registers.

Figure 3:
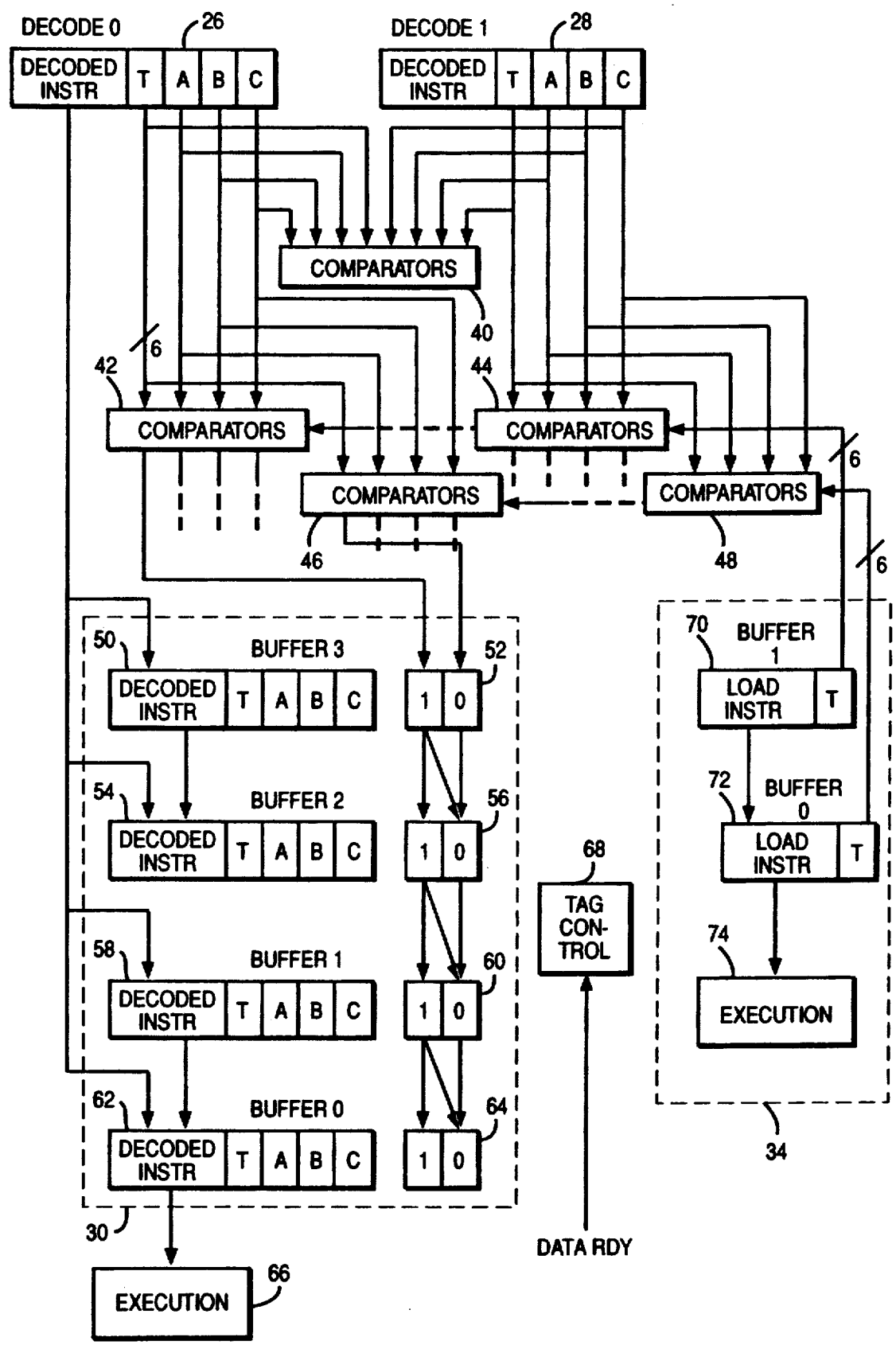
FIG. 3 is a block diagram illustrating the instruction decode logic interconnected to the instruction queue in the floating point unit 16.

FIG. 3 illustrates the tag mechanism of the present invention. This invention consists of circuitry in the floating point unit 16. In the floating point unit 16, the decode 0 register 26 and the decode 1 register 28 store instructions that are decoded. In the process of decoding, comparisons are made using comparators 40, 42, 44, 46 and 48 to determine if any of the instructions that are being decoded are dependent upon the execution of load instructions stored in the load instruction queue 34, illustrated in FIG. 3 as queue locations 70 and 72. Both queue locations 70 and 72 contain a six bit "T" descriptor, which is the address of the register in the floating point execution unit 16 that is being loaded by the load instruction. These register addresses are input to the comparators 40, 42, 44, 46 and 48 to be compared against the registers specified by the instructions in the decoding circuits 26 and 28. It should be understood that in the preferred embodiment, a floating point instruction includes up to three source registers and one destination register. The source registers are designated "A", "B" and "C". The destination register or target register is designated "T". In the preferred embodiment, the floating point execution unit 16 provides the execution of an instruction that performs both multiplication and add or "A*B+C". According to the format, the result of the multiplication/addition operation is then placed in a target register "T".

If a positive comparison is made of any of the registers with the register designators in the instructions being decoded, the appropriate tags are set when the instruction is stored in the instruction buffer 62. The tag is stored in a two bit buffer 64 under control of the tag control circuitry 68. The buffers 50, 54, 58 and 62 correspond to the instruction queue 30 illustrated in FIG. 2. As each instruction is decoded, it is stored in the first available buffer (starting with buffer 72 for load instructions and buffer 62 for all other floating point instructions). Therefore, all asynchronous instructions (instructions that are executed in the floating point execution unit 16 independently of the execution of instructions in the fixed point unit 14) are stored first in buffer 50. Also, as to the instructions stored in buffers 50, 54, 58 and 62, their respective tags are transferred to tag storage 52, 56, 60 and 64 respectively. When the instruction is dispatched, it is sent to the execution circuitry 66. The tag control logic 68 is connected to receive the data ready signal from the memory bus 8. Upon receiving the data ready, the appropriate tag is then zeroed. Also, the tag control logic will dispatch the instruction in buffer location 62 when both tag bits in buffer locations 64 are zero. In this way, the invention manages the sequence of instructions in the instruction queue to ensure that the data for the execution of the instruction has been properly fetched and is available before the instruction is actually dispatched for execution.

Figure 4:
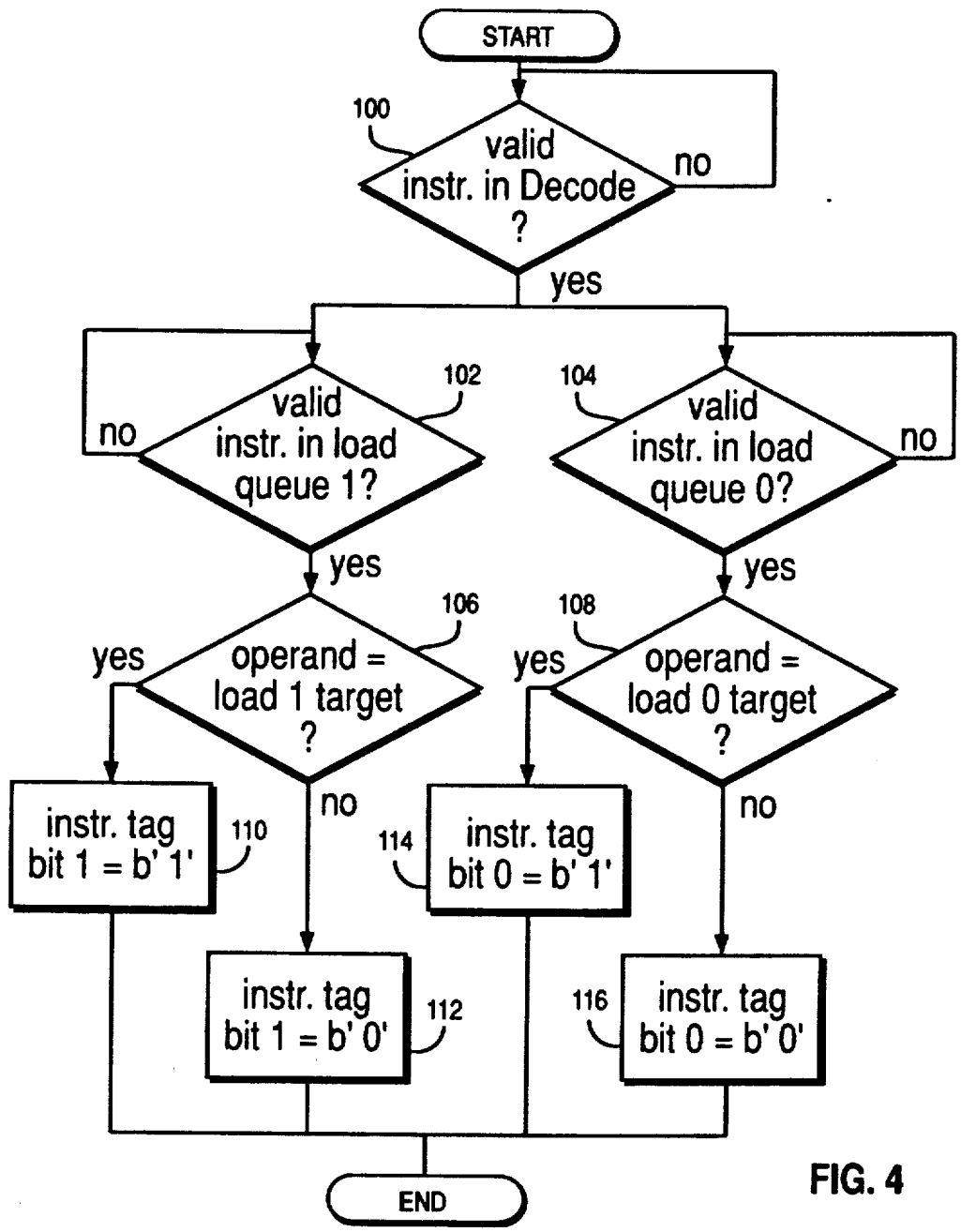
FIG. 4 is a flow chart illustrating the tag procedure.

FIG. 4 illustrates in flow chart form, the tagging procedure. In step 100, it is determined whether there is a valid instruction in the decode circuitry. If not, the control loops until such a valid instruction is present. Next, it is determined in step 102 if a valid instruction is present in the load queue 1. If there is not a valid instruction in load queue 1, the control loops back to the beginning of step 102. If a valid instruction is present in queue 1, then the control proceeds to step 106 to determine if the operand that is being fetched is the appropriate operand for the instruction being decoded. If so, the control proceeds to step 110 to set the instruction tag bit 1 equal to 1. If not, the control proceeds to step 112 to set the instruction tag bit 1 to 0. In parallel, in step 104, the control determines whether the instruction in the load queue 0 is a valid instruction. If not, the control loops back to the beginning of step 104. If there is a valid load instruction present, the control proceeds to step 108 to determine if the operand that is being fetched is the operand for the instruction being decoded, if so, the instruction tag bit 0 is set to a 1 in step 114. If not, the instruction tag bit 0 is set to 0 in step 116.

It should be understood in reference to FIG. 3, that it is possible for an instruction stored in one of the four instruction buffers 50, 54, 58 or 62 to require operands to have been loaded that are being loaded as a result of two load instructions stored in buffers 72 and 70. In that instance, both bits in the bit storage buffers 52, 56, 60 or 64, for its respective instruction buffer 50, 54, 58 or 62, will contain one 1. When the load operation in buffer 72 moves into execution unit 74, the operation in buffer 70 moves down to 72 and the left most bit in tag buffers 52, 56, 60 or 64 moves to the right most bit position. Therefore, if both bit positions are set to 1, this is indicative that both load instructions stored in instruction buffers 70 and 72 have outstanding requests for data. Likewise, if both bit positions are 0, it means there is no dependency on any data being loaded and the instruction may be dispatched for execution.

Figure 5:
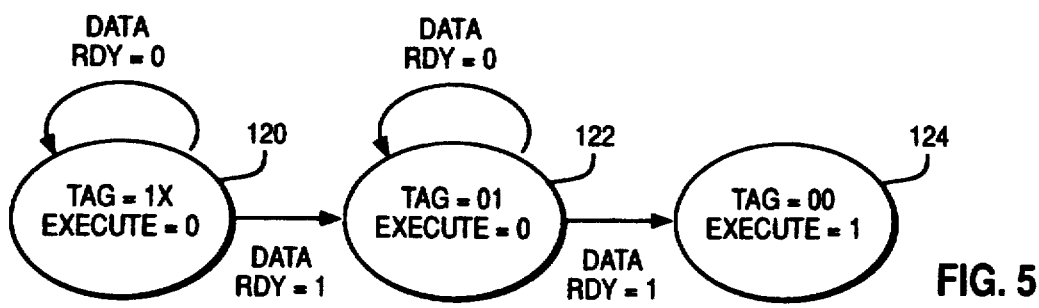
FIG. 5 is a state diagram illustrating the instruction flow through the tag procedure.

FIG. 5 is a state diagram illustrating the sequence of the tag and holding off of the instruction for execution. In the first state 120, the tag is set to 1X, where "X" is a "don't care", when an instruction is dependent upon the load instruction being executed in load buffer 1 70. At that point, the execute state is set to 0, meaning that the instruction cannot be dispatched for execution. As long as the data ready signal for that operand is 0, the process will remain in this state. Once the data ready signal has been received for the operand, the process proceeds to state 122. This is indicative of the load instruction being transferred from the load instruction buffer 70 to the load instruction buffer 72 in FIG. 3. Again, the process remains in state 122 until the next data ready signal is received, at which time the process proceeds to state 124 wherein the tag is set to 00 and the execution state is changed to 1, indicating that the instruction has been dispatched for execution.

FIG. 6A illustrates an instruction sequence. In the operation of a normal sequentially executed pipelined processing system, the first instruction $LD_0$ (indicating a load of register 0) would be the first instruction dispatched for execution. All subsequent instructions would await the completion of this register 0 load. Next, a multiplication instruction is indicated that multiplies the contents of register 2 times the contents of register 3 and stores the result in register 2. Following the multiplication instruction is a load instruction which loads register 1. Lastly, an add instruction is provided which adds the contents of register 0 with the contents of register 1 and stores the result in register 4.

For the purposes of this example, we assume that registers 2 and 3 have been previously loaded. With reference to FIG. 3, the load register 0 instruction is loaded into decode 0 register 26 and the multiply instruction is loaded in the decode 1 register 28 in cycle 1 (FIG. 6B). In cycle 2, the load register 0 instruction is transferred to the outstanding load queue 1 register 72 and the multiply instruction is fed through the asynchronous instruction buffers 50, 54, 58 and 62 to the execution unit 66 for execution since there were no data dependencies.

During cycle 1, the load register 1 instruction is placed in the decode 0 register 26 and the add instruction is placed in the decode 1 register 28. In cycle 1, the load register 0 instruction remains in the outstanding load instruction queue 1 register 72 and the load register 1 instruction is placed in the outstanding load instruction queue 0 register 70. The add instruction is placed in the buffer 0 register 62 and the tag register 64 is set to 11, indicating that the add instruction is dependent upon the completion of both the load instructions stored in registers 70 and 72. In cycle 3, a data ready signal is received as indicated by the data ready line 150. This indicates that data is being provided to the floating point execution unit 16 for storage in the appropriate register. The load instructions remain stored in their appropriate outstanding load instruction queue registers 70 and 72, and the add instruction remains stored in register 62 along with its tag in tag storage 60. In cycle 4, the load register 0 instruction is removed from register 72 since it has been completed and it is replaced by the load register 1 from register 70. While the add instruction remains in register 62, the tag in register 64 is reset to 01 indicating that one load instruction has been completed, and the outstanding load of which the instruction is dependent is now located in register 72. In cycle 5, a second data ready signal is received on line 150. In cycle 6, since the second piece of data has been received by the floating point execution unit 16, the add tag is set to 00 and the add instruction is dispatched to the execution unit 66.

FIG. 7A is the second sequence of instructions similar to the sequence of instructions in FIG. 6A. However, the instruction sequence in FIG. 7A includes a divide instruction as opposed to a multiply instruction. The significance of the divide instruction is that it takes many more cycles than the multiply instruction to complete. In FIG. 6B, the multiply instruction was completed in a single cycle. In the example illustrated in FIG. 7B, the divide instruction takes seven cycles for completion.

In cycle 0, both the load and divide instructions are placed in the decode registers 26 and 28 as before (FIGS. 6A and 6B). In cycle 1, the divide instruction from decode register 28 is placed directly into the execution unit 66. The load register 0 instruction is placed into the outstanding load instruction queue 1 register 72. Also, the load register 1 instruction is placed in decode 0 register 26 and the add instruction is placed in decode 1 register 28. In cycle 2, load register 1 instruction is placed in the outstanding load instruction queue 0 register 70 and the add instruction is placed in the buffer 0 register 62. At that time the tag control logic 68 sets the tag in the completion of both the load instructions in registers 70 and 72. In cycle 3, a data ready signal is received as indicated by line 152.

In cycle 4, the load register 0 instruction is discarded since it has been completed and the data has been loaded in the appropriate floating point execution unit register. The load register 1 instruction is then moved from register 70 to register 72. The tag control logic 68 then resets the tag in tag storage 64 to 01, indicating a data dependency on only a single load instruction and that load instruction being stored in register 72. In cycle 5, a second data ready signal is received. In cycle 6, the load 1 instruction in register 72 is discarded since it has been completed and the data has been appropriately loaded in the floating point execution unit. The tag control logic 68 has reset the tag temporarily stored in tag storage 64 to 00, indicating no data dependencies for the add instruction stored in register 58. However, the divide instruction is continuing to execute. In cycle 7, the divide instruction still continues to execute and, therefore, the add instruction in buffer 1 register 62 cannot be dispatched to the execution unit 66. In cycle 8, the divide instruction is finally completed and the add instruction is then dispatched, saving a total of 3 cycles over a purely sequential execution.

FIG. 8A contains a third instruction sequence where two load instructions are decoded and are followed by an add and multiply instruction. The purpose of this instruction sequence is to illustrate that instructions not having a data dependency (not dependent upon an outstanding load being completed) can be dispatched to the execution unit. In FIG. 8B, the load register 0 instruction and the load register 1 instruction are dispatched to the decode 0 register 26 and decode 1 register 28 respectively. In cycle 1, the load register 0 instruction is placed in the outstanding load instruction queue 0 register 72. The load register 1 instruction is placed in the outstanding load instruction queue 0 register 70. The add and multiply instructions are placed in the decode 0 register 26 and decode 1 register 28 respectively. Note that both the add and multiply instructions are dependent upon data being loaded into register 0. It is assumed for the purposes of this example that the other data required by these instructions (in registers 5 and 7) have already been provided. In cycle 2, the load register 1 and load register 0 instructions remain in registers 70 and 72 respectively, while the multiply instruction has been placed in the buffer 1 register 58 and the add instruction has been placed in the buffer 0 register 62. Since both the add and multiply instructions are dependent upon the load instruction in register 72 being completed, the tags are both set to 01. These tags are stored in registers 60 and 64 for their corresponding instructions. In cycle 3, a data ready signal is received on line 154. In cycle 4, the add instruction has its tag in temporary storage 64 reset to 00, and the add instruction is dispatched to the instruction unit 66 for execution. Meanwhile, the multiply instruction is moved to buffer 0 register 62 and its tag follows into the tag storage 64 from tag storage 60. Like the add instruction, the tag for the multiply instruction has been reset to 00, indicating that no data dependencies are present. Also, in cycle 4, the load 0 instruction, which now has been completed, is discarded. The load register 1 instruction has been transferred to the outstanding load instruction queue 1 register 72. In cycle 5, the multiply instruction is dispatched to the execution unit 66 while the load register 1 instruction awaits completion. Finally, in cycle 8, a data ready signal is received on line 154, indicating that the load register 1 instruction has been completed.

While this invention has been particularly shown and described with respect to this preferred embodiment, it should be understood by those skilled in the art that changes may be made in the form and detail without departing from the scope and spirit of the invention.

I claim:

1. A data processing system comprising;
    an instruction execution means for executing first instructions;
    fetch means, connected to a memory, for fetching instructions from said memory and for fetching data from the memory in response to second instructions;
    instruction decoding means connected to said fetch means, for decoding fetched instructions, for dispatching said first instructions to an instruction queuing means, and for dispatching said second instructions to said fetch means; and
    said instruction queuing means, connected to said instruction decoding means, said fetch means and said instruction execution means, for storing decoded first instructions, determining if data required for said stored first instruction execution has not been fetched, tagging a stored first instruction when data required for execution has not been fetched, clearing tags on said first instructions when the data required for execution is fetched, and providing the untagged first instructions to the instruction execution means and storing said second instructions.

2. A data processing system according to claim 1 wherein said instruction queuing means further includes a first queue means for storing register to register instructions and register to memory instructions and a second queue means for storing memory to register instructions.

3. A data processing system according to claim 2 wherein said instruction decoding means includes first and second instruction decoding circuit means for decoding two instructions simultaneously.

4. A data processing system according to claim 3 wherein said fetch means includes a second instruction queue for storing said second instructions while data is fetched from memory in response to the second instructions and said instruction queuing means includes means for storing second instructions stored in said second instruction queue separately from the storing of the first instructions.

5. A data processing system according to claim 4 wherein said fetch means includes means for providing data fetched in response to a second instruction to the instruction execution means.

6. A data processing system according to claim 5 wherein said instruction queuing means clears a tag for a stored first instruction when data required for that first instruction has been stored in the instruction execution means by the fetch means.

7. A data processing system according to claim 6 wherein said instruction decoding means includes comparison means for determining for each decoded first instruction if data is required for execution from a second instruction stored in the instruction queuing means.

8. A data processing system according to claim 7 wherein said instruction queuing means includes a plurality of ordered first instruction storage latches including first instruction tag latches to store first instructions in an ordered sequence with their respective tags and said instruction queuing means further includes means of changing the order of said stored first instructions and corresponding tags in response to execution of second instructions.

9. In a data processing system including an instruction execution circuit for executing first instructions, a fetch circuit for fetching instructions from a memory and fetching data from the memory in response to second instructions, an instruction decoding circuit for decoding fetched instructions, and an instruction queuing circuit for storing first and second instructions, a computer implemented method for distributing instructions including the computer implemented steps of:
    dispatching from said instruction decoding circuit said first instructions to the instruction queuing circuit;
    dispatching from the instruction decoding circuit the second instructions to the fetch circuit;
    storing decoded first instructions in the queuing means;

determining if data required for the first instruction execution has not been fetched;

tagging a stored first instruction when data required for the execution has not been fetched;

clearing tags on the first instructions when data for the execution is fetched; and providing the untagged first instructions to the instruction execution circuit.

* * * * *